W. L. BRIGGS.
DOUBLE ROW CORN CUTTER.
APPLICATION FILED JUNE 4, 1917.
1,252,880.
Patented Jan. 8, 1918.
2 SHEETS—SHEET 2.
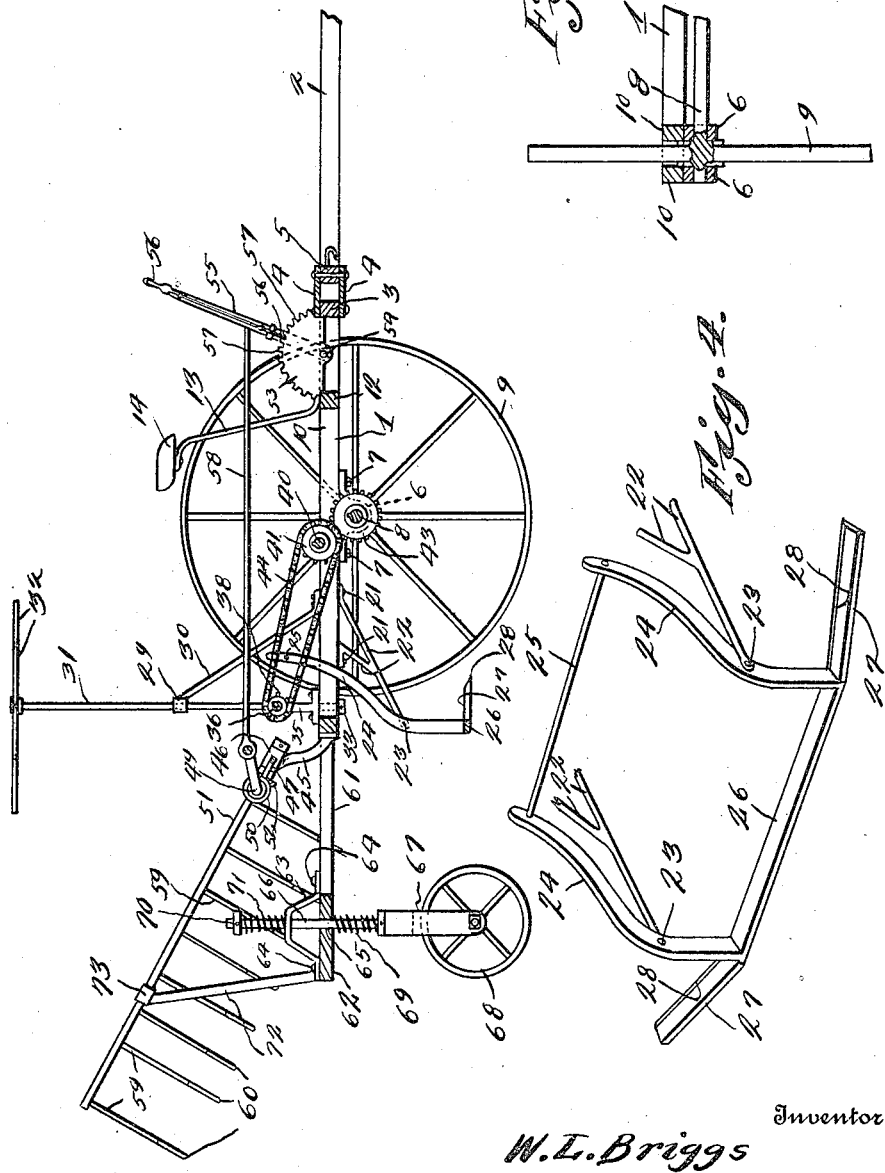
Witnesses
Inventor
W. L. Briggs
By D. Swift & Co.
Attorneys

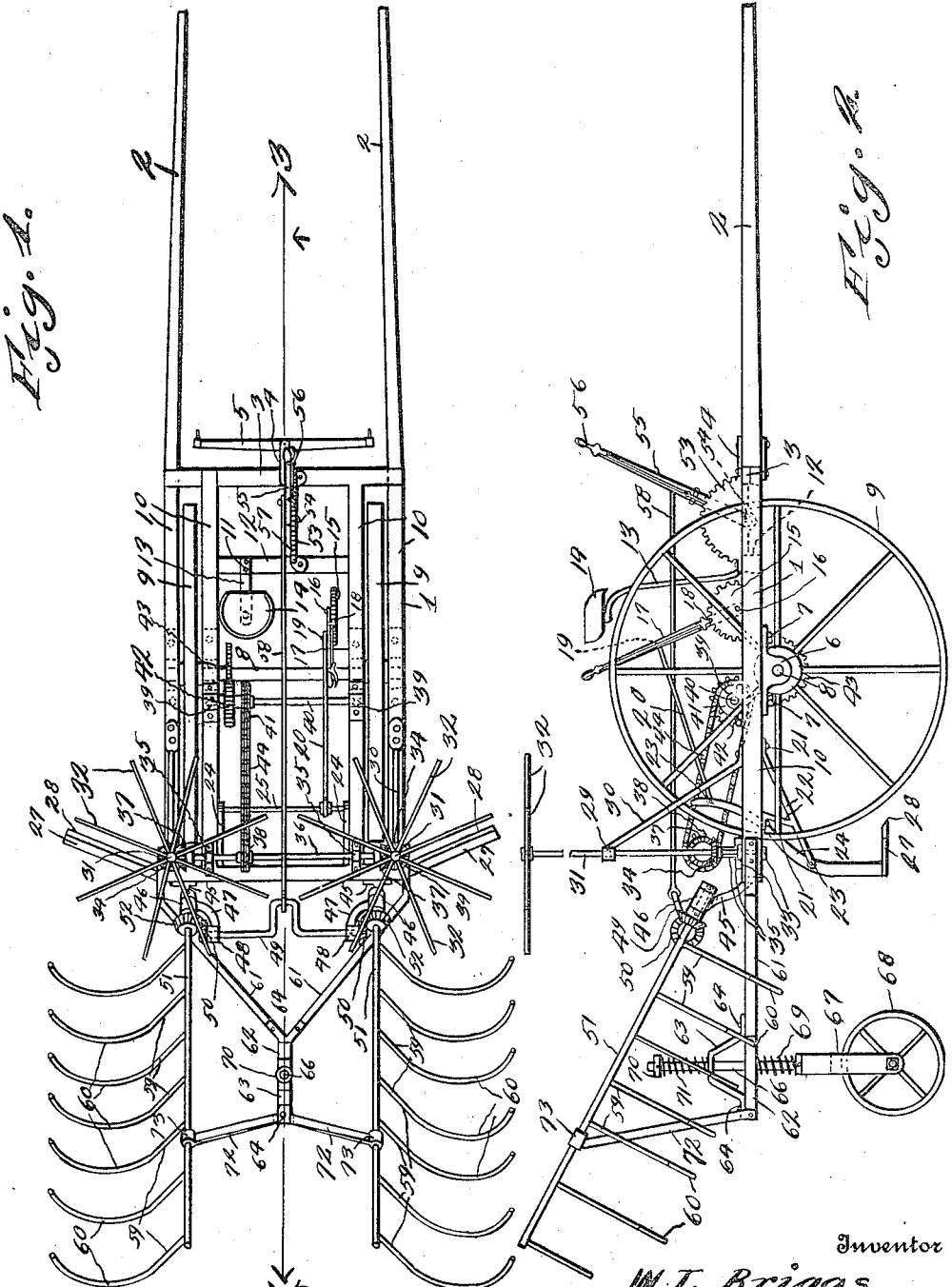

UNITED STATES PATENT OFFICE.

WILLIAM LEE BRIGGS, OF GADSDEN, ALABAMA.

DOUBLE-ROW CORN-CUTTER.

1,252,880.  Specification of Letters Patent.  Patented Jan. 8, 1918.

Application filed June 4, 1917. Serial No. 172,748.

*To all whom it may concern:*

Be it known that I, WILLIAM LEE BRIGGS, a citizen of the United States, residing at Gadsden, in the county of Etowah, State of Alabama, have invented a new and useful Double-Row Corn-Cutter; and I do hereby declare the following to be a full, clear, and exact description of the invention, such as will enable others skilled in the art to which it appertains to make and use the same.

This invention relates to an improved double row corn cutter, and one of the objects of the invention is to provide a very simple, efficient and inexpensive and practical device, whereby two rows of corn may be cut simultaneously and thrown automatically upon side racks.

A further object of the invention is to provide improved severing means, whereby, as the machine travels forwardly, two rows of stalks may be cut at the same time.

A further object of the invention is to provide a device of this kind having means, whereby, as the stalks are severed, they are automatically thrown upon side racks.

A further object of the invention is the provision of rockable racks arranged on the sides of the frame of the machine at the end thereof, to receive the stalks as they are severed or cut, in combination with improved means for rocking the racks downwardly and outwardly, whereby the stalks may be dumped at different intervals across the field.

In practical fields, the details of construction may necessitate alterations falling within the scope of what is claimed.

The invention comprises further features and combination of parts, as hereinafter set forth, shown in the drawings and claimed.

In the drawings:—

Figure 1 is a plan view of the improved double row corn cutter constructed in accordance with the invention, Fig. 2 is a view in side elevation, Fig. 3 is a longitudinal sectional view on line 3—3 of Fig. 1, Fig. 4 is a detail perspective view of the corn stalk severing means, Fig. 5 is a detail sectional view through the bearings for the shaft or axle on which the supporting wheels of the machine are mounted.

Referring more especially to the drawings, 1 designates a suitable frame, which is preferably rectangular, and is provided with forwardly extending shafts 2, and connected to a transverse bar 3 of said frame, by means of the links 4, is a suitable swingle tree 5, to which a draft animal (which is designed to be hitched between the shafts) may be connected. Journaled in bearings 6 (which are fastened by bolts 7 to the under part of the frame centrally) is an axle or shaft 8. Rotatable with the axle are suitable supporting wheels 9, which are arranged between the longitudinally extending bars 10 of said frame. Secured at 11 on a transverse bar 12 of the frame is the support 13 of an operator's seat 14. Supported upon the frame 1 is a segment rack 15, and pivoted thereto, as at 16, is a lever 17, which is provided with a hand grip controlled dog 18 to coöperate with the teeth of said rack 15, to hold the lever in various adjusted positions. Pivoted at 19 to the lever 17 is a suitable link or connecting bar 20.

Fastened at 21 to the underside of the frame, at the rear of the axle, on both sides of the frame, are brackets 22. Mounted upon pivots 23, at the extremities of said brackets, are levers 24, the upper ends of which are connected by the transverse rod 25, to which the link or bar 20 is pivotally connected. The lower ends of the levers 24 are integrally connected by the transverse bar 26, which is provided with laterally extending cutting or severing knives 27, the cutting edges 28 of which face forwardly. These cutting knives, in addition to extending laterally, extend angularly and slightly forwardly, so as to cause a shearing action, whereby the stalks may be severed more efficiently. By imparting backward and forward movements to the lever 17, the levers 24 may be oscillated, whereby oscillatory chopping and shearing strokes may be imparted to the knives to sever the stalks adjacent their bases.

Mounted in bearings on the sides of the frame, near the rear thereof, and in the bearings 29 of the braces 30, are vertical shafts 31, provided on their upper ends with reels 32. By virtue of the collars 33, which are secured upon the shafts 31, above and below the frame, axial movement of said shafts are prevented. By virtue of the reels 32 (which constantly rotate as the machine moves forward) the stalks are thrown upon suitable racks. Mounted upon the shafts 31, and rotatable therewith, are beveled gears 34. Arranged in bearings 35 of the frame 1, at the rear thereof, is a transverse shaft 36, the opposite ends of which are provided with beveled gears 37, which mesh with the beveled gears 34, so that when the shaft 36 is rotated, the shafts 31 and their reels 32 are in turn rotated. Mounted upon and movable with the shaft 36 is a sprocket 38. In bearings 39 of the frame 1 is a shaft 40 provided with a sprocket 41 and a gear 42, which meshes with the gear 43 of the axle 8. A suitable sprocket chain 44 engages about the sprockets 38 and 41, whereby revoluble movements, through the medium of the gears 42 and 43, may be imparted to the shafts 36 and in turn to the shafts 31. Projecting rearwardly and upwardly from the rear of the frame are brackets 45 having bearings 46, and extending from the sides of the bearings and inwardly toward each other are arms 47, in bearings 48 of which, a crank shaft 49 is mounted. The opposite ends of the crank shaft 49 have beveled gears 50, and mounted in the bearings 46 are the shafts 51 of the racks, which are designed for receiving the stalks as they are severed. Suitable beveled gears 52 are fast upon the shafts 51 of the racks, mesh with the beveled gears 50, whereby, as the crank shaft is rocked in one direction or the other, the racks are in turn rocked, so that the stalks may be dumped to one side of the machine. A suitable segment rack 53 is mounted upon the forward part of the frame 1, and pivoted thereto, as at 54, is a lever 55. The lever 55 is provided with a hand gripped controlled dog 56, to coöperate with the teeth 57 of the rack 53. A suitable rod or link 58 is connected to the crank of the shaft 49, and in turn to the lever 55, whereby, when the lever 55 is oscillated in one direction or the other, an oscillatory movement may be imparted to the shaft 49, so that the corn stalk supporting racks may in turn be dumped. The stalk receiving racks consist of the arms 59, which extend downwardly, partially rearwardly and slightly outwardly and terminate in elongated outwardly extending curved parts 60, upon which the stalks, as they are severed, are thrown by the arms of the revolving reels 32.

Secured to the rear part of the frame 1 in any suitable manner, and extending rearwardly, is a V-shaped auxiliary frame 61, provided with an extension 62. An arch bracket 63 is secured at 64 to the frame 61. Mounted in a bearing 65 of said frame 61 and in a bearing of the bracket 63, is an extension rod 66 of a forked member 67. A suitable supporting wheel 68 is journaled in the forks of the member 67. On the extension rod 66 and interposed between the frame 61 and the forked member 67, is a spring 69. Arranged between a suitable nut 70, threaded on the upper end of the extension rod 66, and the arched bracket 63, is a spring 71. By this arrangement and construction of the parts 66, the arch 63 and the springs, the supporting wheel 68 is yieldably mounted, so that the frame 1 will rock yieldably on the axle 8, as the machine traverses the field. Rising upwardly from the extension 62 of the frame 61 are upwardly and laterally extending arms 72 having bearings 73 for the shafts 51.

The invention having been set forth, what is claimed as new and useful is:—

1. In a double row corn harvester, a double row corn cutting device, comprising a pair of levers, a supporting frame provided with brackets having their rear terminals directly oppositely disposed, and on which terminals said levers are pivotally mounted, a bar connecting the lower extremities of the levers and having its opposite ends merging into cutting knives, extending laterally and inclined forwardly, whereby their cutting edges may have shearing actions on the stalks, a rod connecting the upper extremities of the levers, and means connected to said rod for holding said double row corn cutter in different adjusted positions.

2. In a double row corn harvester, a frame, supporting wheels therefor, said frame having rearwardly extending brackets provided with bearings, rearwardly and upwardly inclined shafts mounted in said bearings and provided with arms extending downwardly and rearwardly and curving outwardly and laterally, thereby constituting stalk receiving racks, said shafts of the racks having gears, inwardly extending arms on said bearings and provided with bearings, a crank shaft mounted in the bearings of the arms and having gear connections with the shafts of the racks, and means having a connection with the crank of said crank shaft for rocking the racks simultaneously to dump the stalks, and upwardly extending bearing arms on the frame for receiving and supporting and reinforcing the upper rear extremities of the shafts of the racks.

In testimony whereof I have signed my name to this specification in the presence of two subscribing witnesses.

WILLIAM LEE BRIGGS.

Witnesses:
W. B. PANDER,
W. J. BEGGS.